Figure 2:
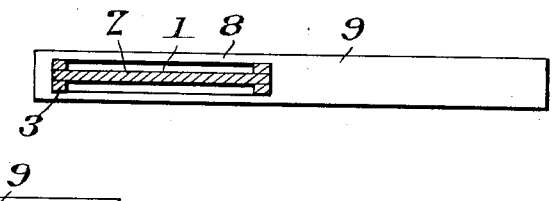

J. G. DEITZ.
METHOD OF MEASURING ROLLED MATERIAL.
APPLICATION FILED MAY 8, 1915.

1,160,051.

Patented Nov. 9, 1915.
2 SHEETS—SHEET 1.

Witnesses
M. H. Slifer
C. A. Hines

Inventor
J. G. Deitz
By Victor J. Evans
Attorney

J. G. DEITZ.
METHOD OF MEASURING ROLLED MATERIAL.
APPLICATION FILED MAY 8, 1915.

1,160,051.

Patented Nov. 9, 1915.
2 SHEETS—SHEET 2.

Fig. 3.

| | 1 | 2 | 3 | 4 | 5 | 6 | 7 | 8 | 9 |
|---|---|---|---|---|---|---|---|---|---|
| 1 | .087 | .174 | .261 | .349 | .436 | .523 | .610 | .698 | .785 |
| 3 | .098 | .196 | .294 | .392 | .490 | .588 | .687 | .785 | .883 |
| 5 | .109 | | | | | .653 | | .872 | .981 |
| 231 | 1.341 | 2.683 | 4.025 | 5.366 | 6.708 | 8.050 | 9.392 | 10.733 | 12.075 |
| 233 | 1.352 | 2.707 | 4.057 | 5.410 | 6.763 | 8.115 | 9.468 | 10.821 | 12.173 |
| 235 | 1.363 | 2.727 | 4.090 | 5.454 | 6.817 | 8.181 | 9.544 | 10.908 | 12.271 |
| 237 | 1.374 | 2.748 | 4.123 | 5.497 | 6.872 | 8.246 | 9.621 | 10.995 | 12.370 |
| 239 | 1.385 | 2.770 | 4.156 | 5.541 | 6.926 | 8.312 | 9.697 | 11.082 | 12.468 |
| 241 | 1.396 | 2.792 | 4.188 | 5.585 | 6.981 | 8.377 | 9.773 | 11.170 | 12.566 |
| | 1 | 2 | 3 | 4 | 5 | 6 | 7 | 8 | 9 |
| 255 | 1.472 | 2.945 | 4.417 | 5.890 | 7.363 | 8.835 | 10.308 | 11.781 | 13.253 |
| 257 | 1.483 | 2.967 | 4.450 | 5.934 | 7.417 | 8.901 | 10.384 | 11.868 | 13.351 |
| 259 | 1.494 | 2.988 | 4.483 | 5.977 | 7.472 | 8.966 | 10.461 | 11.955 | 13.449 |
| 261 | 1.505 | 3.010 | 4.516 | 6.021 | 7.526 | 9.032 | 10.537 | 12.042 | 13.548 |
| 263 | 1.516 | 3.032 | 4.548 | 6.065 | 7.581 | 9.097 | 10.613 | 12.130 | 13.646 |
| 265 | 1.527 | 3.054 | 4.581 | 6.108 | 7.635 | 9.163 | 10.690 | 12.217 | 13.744 |
| 267 | 1.538 | 3.076 | 4.614 | 6.152 | 7.690 | 9.228 | 10.766 | 12.304 | 13.842 |
| 269 | 1.548 | 3.097 | 4.646 | 6.195 | 7.744 | 9.294 | 10.842 | 12.391 | 13.940 |
| 271 | 1.559 | 3.119 | 4.697 | 6.239 | 7.799 | 9.359 | 10.919 | 12.479 | 14.039 |
| 273 | 1.570 | 3.141 | 4.712 | | | | | | |

.1 yd. = 3.6 in. .8 yd. = 2 ft. + 4.8 in.
.2 yd. = 7.2 in. .9 yd. = 2 ft. + 8.4 in.
.3 yd. = 10.8 in.
.4 " = 1 ft. + 2.4 in.
.5 " = 1 ft. + 6.0 in.
.6 " = 1 ft. + 9.6 in.
.7 " = 2 ft. + 1.2 in.

Fig. 4.

| | 1 | 2 | 3 | 4 | 5 | 6 | 7 | 8 | 9 |
|---|---|---|---|---|---|---|---|---|---|
| 2 | .092 | .185 | .278 | .370 | .463 | .555 | .649 | .741 | .834 |
| 4 | .103 | .207 | .310 | .414 | .512 | .621 | .725 | .828 | .932 |
| 6 | .114 | .229 | .343 | .458 | .572 | .686 | .801 | .916 | 1.030 |
| 8 | .125 | .250 | .376 | .501 | .626 | .751 | .878 | 1.003 | 1.129 |
| 10 | .136 | .272 | .408 | .545 | .681 | .817 | .954 | 1.090 | 1.227 |
| 12 | .147 | .294 | .441 | .588 | .736 | .882 | 1.030 | 1.177 | 1.325 |
| 14 | .158 | .316 | .474 | .632 | .790 | .947 | 1.107 | 1.265 | 1.423 |
| 16 | .169 | .338 | .507 | .676 | .845 | 1.013 | 1.183 | 1.352 | 1.521 |
| 18 | .179 | .359 | .538 | .719 | .899 | 1.079 | 1.259 | 1.439 | 1.619 |
| | 1 | 2 | 3 | 4 | 5 | 6 | 7 | 8 | 9 |
| 32 | .256 | .512 | .769 | 1.025 | 1.281 | 1.530 | 1.794 | 2.050 | 2.307 |
| 34 | .267 | .534 | .812 | 1.069 | 1.336 | 1.603 | 1.870 | 2.137 | 2.405 |
| 36 | .278 | .556 | .834 | 1.112 | 1.390 | 1.668 | 1.947 | 2.224 | 2.503 |
| 38 | .289 | .578 | .867 | 1.156 | 1.445 | 1.734 | 2.023 | 2.312 | 2.601 |
| 40 | .299 | .600 | .899 | 1.199 | 1.499 | 1.799 | 2.099 | 2.399 | 2.699 |
| 42 | .310 | .621 | .932 | 1.234 | 1.554 | 1.865 | 2.176 | 2.487 | 2.797 |
| 44 | .321 | .643 | .965 | 1.287 | 1.608 | 1.930 | 2.252 | 2.573 | 2.896 |
| | | | | | 1.996 | | | | |

.1 yd. = 3.6 in. .8 yd. = 2 ft. + 4.8 in.
.2 yd. = 7.2 in. .9 yd. = 2 ft. + 8.4 in.
.3 yd. = 10.8 in.
.4 yd. = 1 ft. + 2.4 in.
.5 yd. = 1 ft. + 6.0 in.
.6 yd. = 1 ft. + 9.6 in.
.7 yd. = 2 ft. + 1.2 in.

Witnesses

M. H. Slifer
C. C. Hines

Inventor
J. G. Deitz
By Victor J. Evans
Attorney

UNITED STATES PATENT OFFICE.

JOHN G. DEITZ, OF MACON, GEORGIA.

METHOD OF MEASURING ROLLED MATERIAL.

1,160,051.        Specification of Letters Patent.       Patented Nov. 9, 1915.

Application filed May 8, 1915. Serial No. 26,842.

*To all whom it may concern:*

Be it known that I, JOHN G. DEITZ, a citizen of the United States, residing at Macon, in the county of Bibb and State of Georgia, have invented new and useful Improvements in Methods of Measuring Rolled Material, of which the following is a specification.

This invention relates to a novel and improved method of calculating the linear measurement of rolled material, such as bolts or rolls of carpet, linoleum, belting, wire fencing, etc., so that the amount of material, in length, in a roll of any given size may be determined.

The object of the invention is to provide a new method of laying off basic measurements and applying known mathematical factors so as to produce a new formula or method of calculation, whereby the desired result may be easily, quickly, conveniently and accurately determined, with little or no mental calculation.

Figure 1:
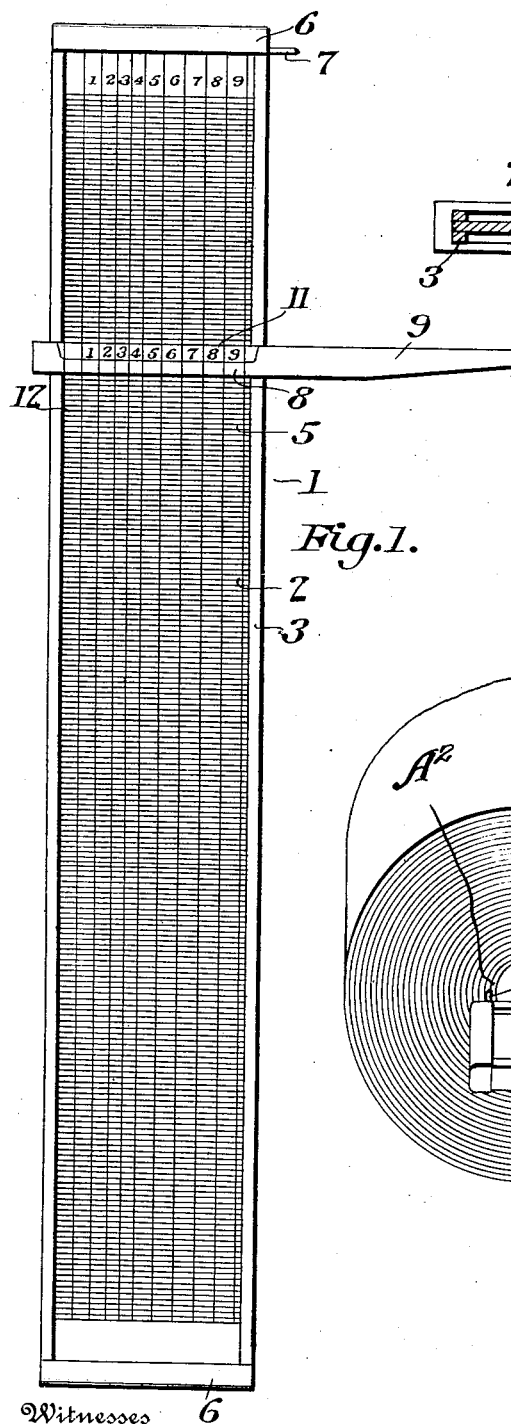
Figure 5:
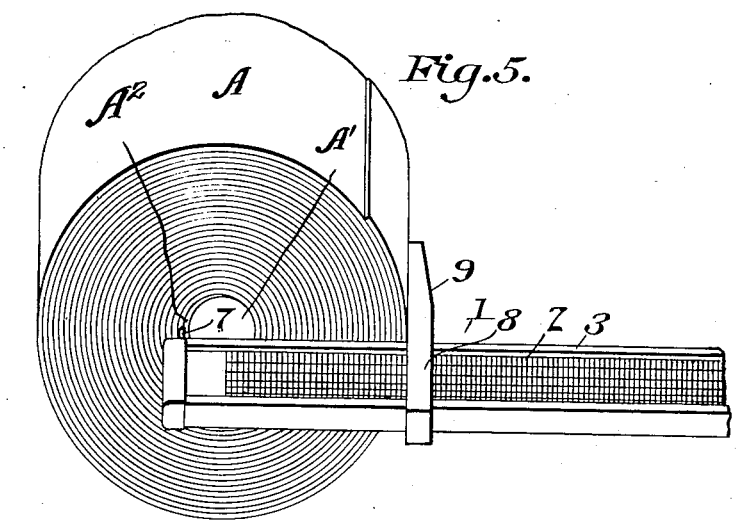

In the accompanying drawings, illustrative of the invention, and showing one form of means for carrying the same into practical effect,—Figure 1 is a view of one side of a device, instrument or apparatus embodying my invention. Fig. 2 is a transverse section thereof. Figs. 3 and 4 are fragmentary views of the obverse and reverse sides of the device on an enlarged scale. Fig. 5 is a diagrammatic view showing the use of the device in finding the basic measurement or measurements.

Referring to the drawings, 1 designates the body or stock of the measuring device, which is shown as in the form of an oblong rectangular frame including a board or plate 2, longitudinal or side strips 3 secured to and projecting from the obverse and reverse faces 4 and 5 of the board, and end strips 6 also secured to and projecting from said faces of the board. Projecting laterally from one of the longitudinal side edges of the stock, at or near one end thereof, is a fixed or stationary indicating pin or member 7, and slidably mounted for longitudinal movement upon the stock is a movable indicator 8 which is adjustable with relation to the member 7 and indicia upon the faces of the stock, as hereinafter described. In the present instance columns of indicia are arranged upon both faces of the stock, and the sliding indicator, which has a projecting handle 9, is constructed to provide indicating blades 10 and 11 for coöperation with the sets of columns of matter upon the respective faces 4 and 5, but it is to be understood that where the stock is provided with but a single set of columns the indicator may have but a single indicating blade for coöperation therewith.

As stated, the device is adapted for use in making basic measurements, based upon minimum and maximum linear units, which may vary as circumstances may require, but which in the present instance may be expressed in one-sixteenth of an inch as the minimum unit and a yard or multiples thereof as the maximum unit. These minimum units are arranged upon the board in the form of a linear scale, and upon the board are also arranged columns of figures denoting the maximum units expressed in multiples thereof based upon a fixed or common multiplying factor. As shown, each face of the board is provided along one of its side margins with a scale 12 and a series of columns denoted 13 to 21, inclusive, of the character described. This scale is provided with horizontal transverse lines representing minimum units distances and which extend across the chart and form the division lines or spaces of the columns which register therewith, in which division lines are placed the figures representing the maximum units measurements based upon the multiplication of the figures of the scale by the said fixed or common multiplying factor. For convenience in preparing the chart so that comparatively large-sized indicia numerals may be used one half of the chart is preferably placed upon the obverse face 4 of the stock and the other half of the chart upon the reverse face 5 of the chart, the first half mentioned containing the serial numbers of the minimum units expressed in uneven or odd figures, as 1, 2, 3, etc., together with the proper maximum units in the associated columns, while the second half of the chart contains the even numbers of the scale, as 2, 4, 6, etc., together with the proper maximum units in the associated columns, the two scales and sets of columns conjointly expressing the units in sixteenths of an inch and multiples thereof, while the scales and sets of columns separately express the odd and even divisions separately in eighths of an inch and divisions thereof, as will be readily understood. In other words, by the described arrangement of the even and odd number sections of the scale, a scale of sixteenths is provided, the sections of which are given in the even and odd numbers in eighths, so that the subject matter of the scale may be printed in comparatively large type and rendered more legible. In the views showing the respective sections of the scales the short lines in the left hand columns represent the intervening sixteenth fractions, as will be readily understood.

The basic measurement or measurements referred to, and which constitute the essence of my invention, is the amount or amounts in minimum units obtained as a result of first obtaining the basic measurement indicating the average diameter of all convolutions in the roll, by first finding the radius of the roll plus the distance between the axis of the roll and outer surface of the innermost winding or convolution of the material, or the total distance represented thereby, multiplied by the number of windings in the roll. The sum of these figures or the figure obtained is then multiplied by the common diametrical factor 3.1416, giving the maximum linear unit representing the amount of material contained in the roll or a figure which when multiplied by tens, hundreds, etc., will give the length of the material. In carrying out this principle in the use of the calculating instrument, the basic measurement or measurements are first found for each minimum linear unit, multiplied by the factor 3.1416, and then multiplied by numbers representing numbers of windings or convolutions, which numbers are placed in the sums of the results in the respective columns opposite the proper numerals on the scales. For sake of simplicity, but nine columns of numerals are employed, and the final results mentioned are placed therein in proper order and expressed in decimals to the tenth, hundredth, and thousandth degree. Example:—one inch being the minimum and yards the unit results are to be expressed in, then;

$1 \times 3.1416 \div 36$ equals A.
$A \times 2$ equals column #2.
$A \times 3$ " " #3.
$A \times 4$ " " #4.
$A \times 5$ " " #5.
$A \times 6$ " " #6.
$A \times 7$ " " #7.
$A \times 8$ " " #8.
$A \times 9$ " " #9.
$A \times I$ " " #I.

Then every 1/16 of an inch or other equal proportion of the given unit is likewise computed and the nine final and distinct results obtained, are placed in their respective places following each other. This is continued until maximum limit desired is reached.

In using the device for calculating the length or amount of material in a roll, as shown in Figs. 5 and 6, in which A designates the material, A' the core about which the material is wound, and $A^2$ the inner winding or convolution of the core, the device is extended across the end of the roll with the scale side placed adjacent to the roll and the indicating pin or member 7 is then adjusted to lie in alinement with the outer face of the winding $A^2$ at one side of the axis of the roll. When this has been done the movable indicating slide is adjusted along the scale until the indicating edge of its blade registers with the fraction of the scale in alinement with the outer surface of the outermost winding of the roll at the diametrically opposite side of the axis of the roll. The figure of the scale opposite this fraction will indicate the basic measurement desired, i. e., the average diameter of all convolutions in the roll, which is then multiplied by the number of the windings in the roll to obtain a second or final basic measurement, the product being then multiplied by the common factor 3.1416, which is the process in making a mental calculation. In the use of the instrument, however, the result giving the linear measurement of the material in the roll will be indicated by the figure in the column representing the number of windings, as the column 9, in the horizontal space alining with the indicated fraction on the scale. Of course, it will be understood that the *modus operandi* may be modified by first finding the radius of the roll and then finding the distance between the center of the core or axis of the roll and the outer surface of the first convolution or winding, the sum of the distances of which will give the first basic measurement hereinbefore referred to. Having located the horizontal column for basis of calculations, the linear measurements of all complete convolutions will be found in the perpendicular columns or columns of the chart, which may in practice be numbered the same as the figure or figures representing the number of windings, each designating ordinal therefor expressing the number of windings in each column on which the result figures appearing therein are calculated. Where the number of windings is in excess of the number of columns, the result will be gained by adding the amounts in the proper horizontal spaces of the plurality of columns corresponding in figures to the number of windings; as, for example, if there are twenty-six windings in the roll the figures obtained in the proper horizontal spaces of columns 2 and 6 (designated by the reference characters 14 and 18) will give the proper amount.

Inasmuch as each perpendicular column expresses results as shown in the units only,—the decimal point must be moved one place to right for results in the tens, two places to the right for results in the hundreds, and in like manner on. Therefore providing the number of turns in the roll are expressed in the tens, move the decimal point one place to right in the perpendicular column expressing tens. If number of turns are expressed in tens and units, then add results shown in column expressing units. If number of turns are expressed in hundreds, then move decimal two places to right in proper column,—if number of turns are expressed in hundreds and tens, then add results obtained for tens,—if number is expressed in hundreds, tens, and units, then add results found for tens and these shown for units. If in the use of the device the movable indicator should register with the linear minimum unit number 241, expressing the final basic measurement, and there are nine windings in the roll being measured, then the answer to the amount of the material contained in the roll will be found in the ninth column of the chart, giving 12.566 yards. If there should be 41 turns or windings in the roll, with the same final basic measurement, then the fourth perpendicular column of the chart, with the decimal point moved one space to the right, gives tens, or 55.85 yards, and with the units as shown in the first perpendicular column, or 1.396 yards added, will give the answer, to wit, 57.246 yards. If there should be 40 windings in the roll, instead, the answer would be found in the fourth indicating column by moving the decimal point over one place, or 55.85 yards, with nothing additional to add, as no units are used in expressing the number of windings. If there should be a number of windings expressed by three numerals instead of one or two, as 141, for example, the decimal point should be moved two places to the right in the first indicating column, giving the result 139.6, adding units and tens as in the second example, amounting to 57.246, giving the total amount as 196.846 yards. If there should be less than a complete winding in the roll, its linear measurement is ascertained by using one of the scales as a rule, or by using any other common rule or tape, adding the same to the dimension found for all complete windings, which gives the complete measurement of linear dimension of roll.

From the foregoing description, taken in connection with the drawings, the mode of use of the device and principle of operation in carrying out the method will be readily understood, without further description. It will of course be understood that the same principle of operation may be employed in a chart in book or other form having the columns set forth properly arranged so as to give the result directly or permit the same to be obtained by easy mental calculation.

The units of linear dimensions as shown on the chart can be changed or interpreted in different tables of linear measurement, or they can be reduced to smaller or increased to larger linear units of expression—by the customary mathematical processes.

The results on the chart can be further itemized and compiled so as to show the dimensions of each winding individually increasing in numerical order by using the units now shown on chart as a basis for the multiplication. This would then eliminate the necessity of any multiplication or addition of units, tens, and hundreds.

The minimum limit of the chart can be lessened at any desired place, and this will not effect the use of the remainder.

The maximum limit of the chart can be increased to include the size of any roll by adding to each perpendicular column, for every one sixteenth of one inch increase, the same increase in figures as successively show now on chart, for every advance of 1/16 of an inch desired.

The results as expressed on this chart can be changed, by reducing given units of expression to any desired degree.

I claim:—

The herein described method of calculating the linear measurement of material in roll form, which comprises the step of obtaining a basic measurement for indicating the average diameter of all convolutions in a roll, by first finding the linear distance between the outer surface of the outer convolution of the roll at one side of the core or axis of the roll and the outer surface of the innermost convolution of the roll at the opposite side of the core or axis of the roll, and using this distance as a factor in the calculation.

In testimony whereof I affix my signature in presence of witness.

JOHN G. DEITZ.

Witness:
BENNETT S. JONES.